Oct. 21, 1952  D. I. CRITOPH ET AL  2,614,458

FILM PROJECTOR HOUSING CONSTRUCTION

Filed Oct. 23, 1948  4 Sheets-Sheet 1

INVENTOR.
DAVID I. CRITOPH
FRED H. WOLFORD
BY JOHN F. HERRMANN

ATTORNEYS

INVENTOR.
DAVID I. CRITOPH
FRED H. WOLFORD
BY JOHN F. HERRMANN

ATTORNEYS

Oct. 21, 1952  D. I. CRITOPH ET AL  2,614,458
FILM PROJECTOR HOUSING CONSTRUCTION
Filed Oct. 23, 1948  4 Sheets-Sheet 3

INVENTOR.
DAVID I. CRITOPH
FRED H. WOLFORD
BY JOHN F. HERRMANN
Louis L. Gagnon
Noble S. Williams
ATTORNEYS Oct. 21, 1952  D. I. CRITOPH ET AL  2,614,458
FILM PROJECTOR HOUSING CONSTRUCTION Filed Oct. 23, 1948  4 Sheets-Sheet 4

INVENTOR.
DAVID I. CRITOPH
FRED H. WOLFORD
JOHN F. HERRMANN
BY
Louis L. Gagnon
Noble J. Williams
ATTORNEYS Patented Oct. 21, 1952

2,614,458

UNITED STATES PATENT OFFICE 2,614,458

FILM PROJECTOR HOUSING CONSTRUCTION

David I. Critoph, Snyder, and John F. Herrmann, Cheektowaga, N. Y., and Fred H. Wolford, Albuquerque, N. Mex., assignors to American Optical Company, Southbridge, Mass., a voluntary association of Massachusetts Application October 23, 1948, Serial No. 56,222

14 Claims. (Cl. 88—26)

1

This invention relates to projection apparatus for use with transparencies and more particularly to certain details of construction relating to mounting, positioning and providing ready access to elements of the apparatus, for dissipating heat therefrom, and for framing the transparencies.

An object of the invention is to provide a projector of simple and sturdy construction and efficient performance.

Another object of the invention is to provide a projector embodying improved constructions for dissipating heat generated by a light source so that inner elements and external portions are maintained in a relatively cool condition.

A further object of the invention is to provide improved housing means having novel features of adjustability and permitting ready access to the interior of the projector.

Still another object of the invention is to provide novel constructions for mounting a lamp and reflector in the projector so that both elements may be easily removed, as a unit, and relative adjustments of the lamp filament and the reflected image thereof may be performed exteriorly of the projector housing, subsequent reinsertion of the unit in the projector and positioning thereof relative to the focal plane of a condenser lens system being rendered possible.

A still further object of the invention is to provide a projector having novel means for mounting a condenser lens system employed therein.

Another object of the invention is to provide novel means for framing image areas of slide films of various dimensions.

A further object of the invention is to provide novel reflector mounting means for positioning the real image of a lamp filament relative to the latter.

These and other objects of the invention will be apparent from the following description taken in connection with the accompanying drawings, wherein like reference characters refer to like parts throughout the several views:

Figure 1:
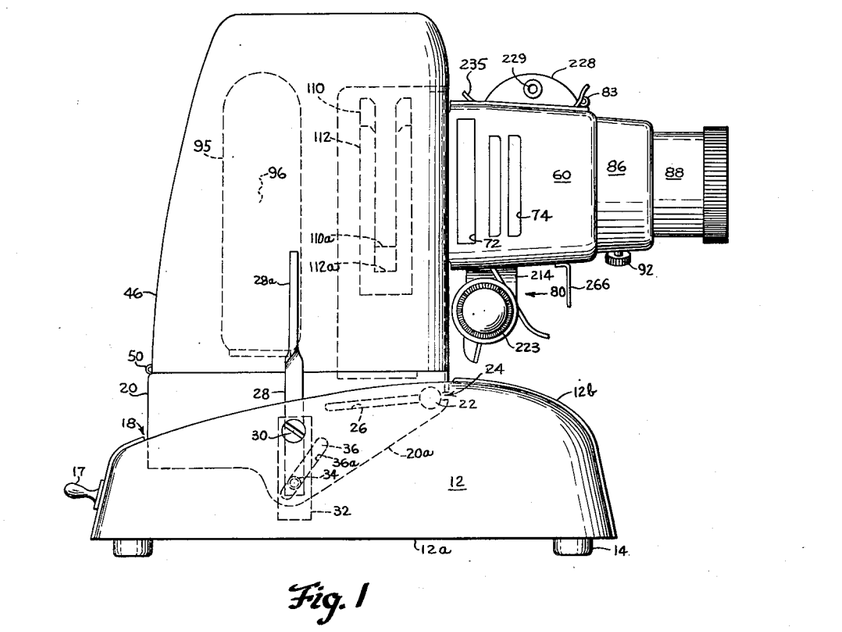
Figure 1 is a side view of the projector.

Referring to Fig. 1, an exterior side view of the slide and slide film projector is shown. The projector comprises a plurality of cooperating portions for housing and supporting its various components. Said portions include a base member 12 which forms a lower chamber within its walls, said member 12 comprising a lower wall 12a having a plurality of supporting feet 14, formed of rubber or the like attached thereto. A plurality of apertures 16 (Fig. 3) are formed in lower wall 12a providing means for intake of air to said chamber wherein a motor-driven fan is located. Toggle switch 17 is employed in motor and lamp circuits of the projector. A relatively large aperture 18 is formed in an upper wall 12b of base 12 for receiving a supporting member 20. An insulating baffle 21 is provided for separating said supporting member from electrical wiring (not shown) leading to toggle switch 17. Supporting member 20 is pivotally mounted upon base 12 as, for example, by a pair of bosses or protuberances 22. Said bosses are formed to extend inwardly from the sides of base 12 and have their inner ends positioned between pairs of indentations 24 formed in frontal side wall portions 20a of supporting member 20 so that these side wall portions may pivot thereon. Side wall portions 20a extend downwardly and terminate within base member 20 in the form of an opening leading into the chamber of the latter. A split construction of wall portions 20a is provided by a pair of slots 26 (one slot only being shown), extending rearwardly appreciably from the front edges of portions 20a and from indentations 24. Said construction permits the lower parts of side wall portions 20a to be sprung together for disengaging the lower indentations 24 from bosses 22 so that supporting member 20 may be separated from base 12. Removal of member 20 permits ready access to chamber means of base 12 through aperture 18.

Figure 4:
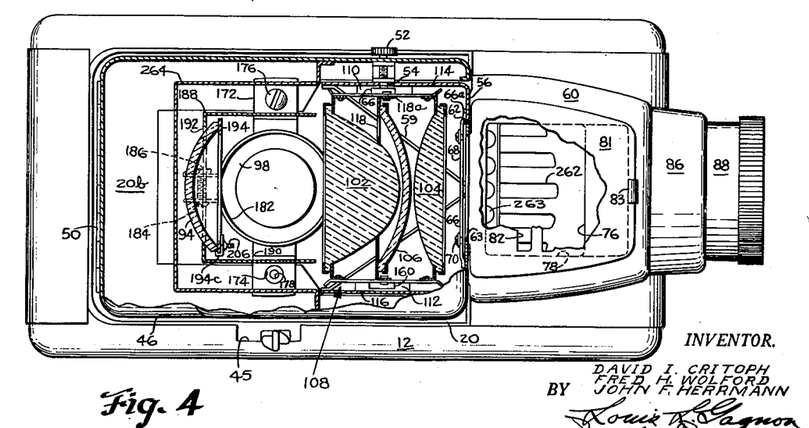
Fig. 4 is a sectional plan view of the projector.
Figures 5, 6:
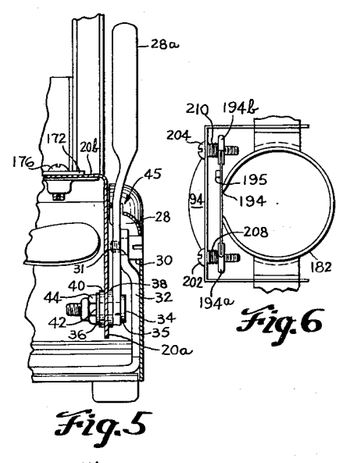
Fig. 5 is a fragmentary rear view of tilting mechanism of the projector.
Fig. 6 is a plan view of a subassembly of the projector including a reflector and a heat baffle.

Supporting member 20 is capable of being tilted about said pivotal means 22—24. Means for the purpose comprise a lever 28 (Figs. 1 and 5) having a pivot 30 preferably rigidly fastened thereto, the latter being rotatably mounted in a perforation 31 formed within a fixed supporting means such as bracket 32. Said bracket may appropriately be rigidly attached, as by welding, to a side wall of base 12. As shown in Figs. 4 and 5, upper portions 20b of supporting member 20 are turned inwardly to provide a substantially horizontal flange for bearing other elements of the projector. A pin 34, preferably fixedly mounted in a perforation 35 formed in a lower portion of lever 28, is slidably positioned in an angular cam slot 36 formed in one of said side wall portions 20a, as shown in Fig. 1, and extending from its lower extremity upwardly and forwardly at a predetermined angle. A pair of friction surfaced washers 38 and 40, preferably of a fiber composition, are mounted upon pin 34 at each side of said side wall portion 20a adjacent slot 36, and are held in frictional contact therewith by spring washer 42 and self-locking nut 44 which is threaded upon pin 34 as shown. Through adjustment of locking nut 44, correct frictional contact of washers 38 and 40 with side wall 20a may be established. Said frictional contact is preferably such that when lever handle 28a, which projects outwardly of base 12 through a slot or recess 45, is manually actuated the braking action of washers 38 and 40 is overcome and pin 34 is permitted to move along slot 36, thereby causing supporting member 20 to tilt or pivot as enabled by pivotal means 22—24. A correct adjustment also provides that when handle 28a is released, said frictional contact of the washers and wall portions 20a under bias of spring washer 42 is sufficient to hold pin 34 at any given stage of its travel in slot 36 and, accordingly, sufficient to hold supporting member 20 at any angle to which it has been tilted. The angular inclination of slot 36, providing different radii along its surfaces, with respect to pivot 30, taken in conjunction with the fixed radius of pin 34 relative to pivot 30 enables said tilting of supporting member 20. The difference in radial distance of each of pivots 30 and 22—24 relative to pin 34, taken in conjunction with said movement of pin 34 in slot 36, enables a relatively small rotation of supporting member 20 in response to a relatively large rotation of lever handle 28a. As shown, the extremities of slot 36 define the limits of rotation of supporting member 20, although it will be apparent that other limit stop means could readily be provided for the purpose.

An upper housing 46 (Figs. 1, 2, 3 and 4) comprises preferably unitary side, rear and partial frontal wall portions, an open bottom, and an aperture 48 formed in its upper extremities, said aperture having light-shielded louvers 49 mounted therewithin. Housing 46 serves to substantially enclose elements of the apparatus, presently to be described, and is pivotally mounted upon supporting member 20 by hinge means 50. Suitable latching means, such as latch 52 (Fig. 4) which is adapted to be inserted in a perforation 54 formed in an inner portion of the projector, is provided for holding housing 46 at closed position. When housing 46 is pivoted about hinge 50 to its open position, access may be had to elements normally enclosed thereby.

A plate member 56 (Figs. 3 and 4), having a circular aperture 58 formed therein, is rigidly attached to frontal portions of supporting member 20, the rigidity thereof being enhanced by a supporting strut 59 (Fig. 4). A frontal housing 60 is rotatably mounted upon plate member 56, mounting means therefor being shown in Figs. 3, 4, and 11, and comprising a circular plate 62 rigidly attached, as by welding, to a rear wall portion 60a of housing 60. Plate 62 has a projection aperture 63 and a plurality of threaded perforations 64 (Fig. 3) formed therein. Rear wall portion 60a has a projection aperture 65 formed therein. Peripheral portions 62a of said plate are adapted to be slidably inserted in aperture 58 of plate member 56. An annular spring-like washer 66, of larger outside diameter and smaller inside diameter than circular aperture 58 of plate member 56, and having bearing surfaces 66a and a plurality of perforations 68, like in number and relative position to perforations 64 of plate 62, is mounted upon plate 62 by a plurality of screws 70 (Figs. 3 and 4) extending through perforations 68 and engaging threaded perforations 64. When screws 70 are tightened, bias is applied by washer 66 to said screws sufficient to draw housing portions 60a in positive but rotatable contact with plate 56. Housing 60 may thereby be readily rotated with respect to plate member 56, rear wall portion 60a preferably being formed to extend slightly beyond other rear wall portions of housing 60 to provide a reduced bearing surface for the purpose.

Figure 2:
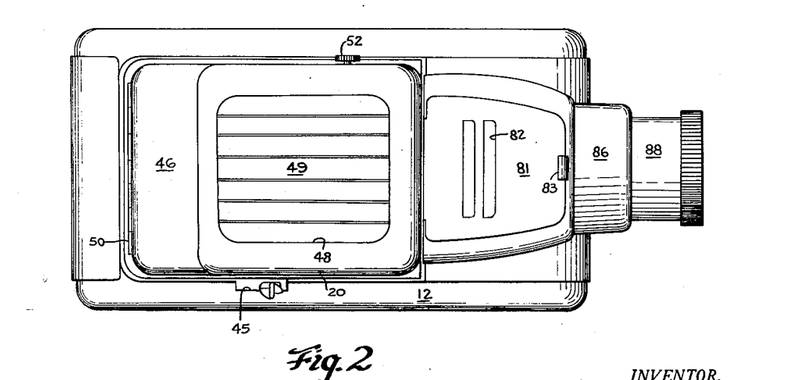
Fig. 2 is a plan view of the projector.
Figure 3:
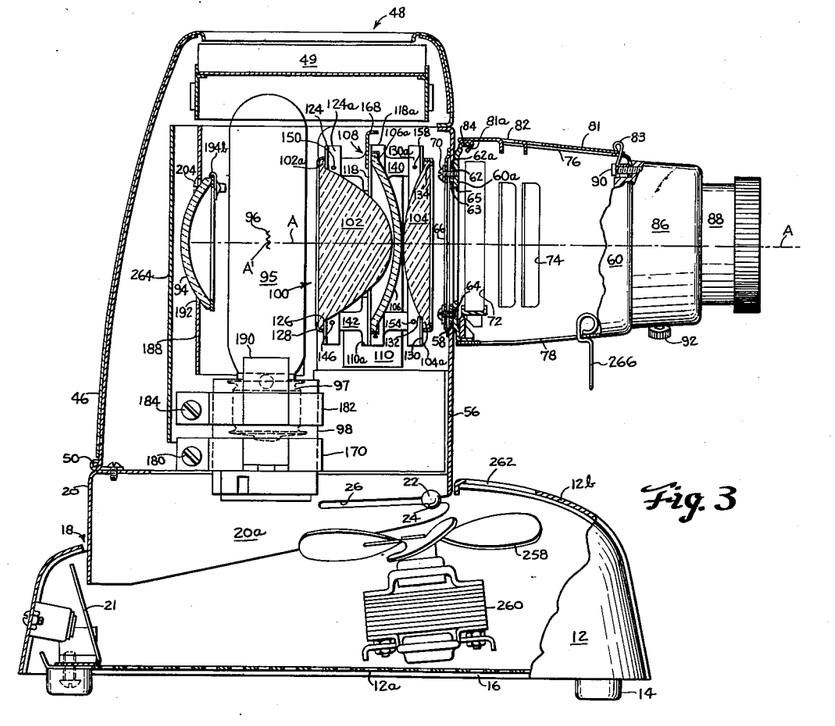
Fig. 3 is a side view of the projector, partly in section.

Frontal housing 60 has a plurality of apertures formed in side, upper and lower portions thereof as shown in Figs. 1, 2, 3 and 4. Slot-like apertures 72 (Figs. 1 and 3) are adapted to have a slide carrier inserted therein. Light-shielded apertures or louvers 74 (Figs. 1 and 3) serve as ventilating means for said housing. Apertures 76 and 78 (Figs. 3 and 4) are adapted to have mechanism 80 (Figs. 1, 11 and 13), for supplying and advancing a slide film, mounted therein. Aperture 78 also serves to admit cool air to housing 60, as will presently be described. As shown in Figs. 2, 3 and 4, a cover plate 81, having light-shielded apertures 82 formed therein, provides a closure for aperture 76 when slide film mechanism 80 is removed from housing 60, cover plate 81 being releasably held at operative position by a clip 83 and one or more ears 84 (Fig. 3), engaging suitably formed extremities 81a of said cover plate. A lens barrel adapter 86, formed for reception of a lens barrel 88 is releasably attached to frontal housing 60 by retaining screw means 90 (Fig. 3). Said adapter has a suitable bore formed therein and a set screw 92 adapted to extend into said bore for releasably holding lens barrel 88, it being assumed that a suitable objective (not shown) is mounted within said lens barrel. Adapter 86 is preferably formed to receive any of a plurality of interchangeable lens barrels which mount objective lenses of various focal length for use with slides of different types.

Referring to Fig. 3, line A—A represents an optical axis extending through optical elements of the projector, presently to be described. A forward prolongation of said optical axis as, for example, an extension thereof to a projection screen, may be elevated or lowered with respect to said screen through previously described tilting mechanism of the projector. Thus, when lever handle 28a of the tilting mechanism, as viewed in Fig. 1, is manually rotated in a counterclockwise direction, pin 34 is caused to travel along slot 36, while providing a bias against slot surface 36a, and to cause pivotal movement of supporting member 20 in a counterclockwise direction around pivotal means 22—24.

Accordingly, upper housing 46, frontal housing 60, adapter 86 and lens barrel 88, and elements mounted therewithin, will simultaneously undergo arcuate or bodily movement in a similar direction and said extension of optical axis A will be elevated with respect to the projection screen. A clockwise rotation of lever handle 28a will produce a reversal of the aforesaid movements.

Elements mounted within housing 46, which are illustrated in assembled relation in Figs. 3 and 4, include a spherical concave reflector 94, a prefocused filament lamp 95, having a filament 96, the base 97 of which is adapted to be mounted in socket 98, and a condenser lens system 100. The latter, in a preferred embodiment, comprises aspheric lens elements 102 and 104 having heat shield 106 interposed therebetween. Said lens and heat shield elements may appropriately be of molded construction, having flanged edges 102a, 104a and 106a, respectively, for mounting the same.

Figure 8:
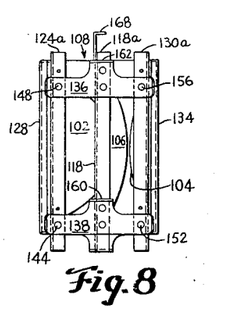
Fig. 8 is a side view of a condenser lens system and means for mounting the same in the projector.
Figure 9:
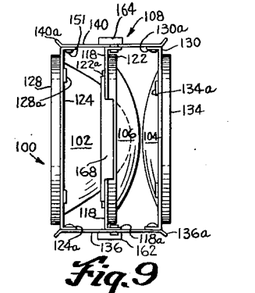
Fig. 9 is a plan view of the elements shown in Fig. 8.
Figure 10:
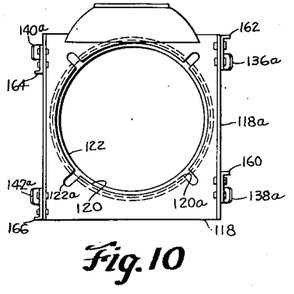
Fig. 10 is a front view of an element shown in Figs. 8 and 9.

Condenser lens system 100, shown in further detail in Figs. 8, 9, and 10, is mounted in a carriage 108. The latter in turn is releasably mounted between track members 110 and 112 (Figs. 1, 3 and 4) which are rigidly attached to a pair of baffles 114 and 116 extending inwardly from frontal plate member 56 and supported by flange 20b of supporting member 20. Strut 59 is rigidly attached to baffles 114 and 116 and to plate member 56 and provides a relative rigidity of said elements.

Condenser lens carriage 108 (Figs. 8, 9 and 10) includes various components which will now be described. A preferably metallic plate-like frame 118 comprising vertical flange portions 118a, and a circular aperture 120 formed therein provides a principal support. A plurality of excised areas 120a are formed in frame 118 to extend radially outwardly from said aperture 120. A rimmed retaining ring 122, comprising a plurality of tabs 122a extending inwardly therefrom, is employed to encircle and bear against the flange 106a (Fig. 3) of said heat shield, tabs 122a being inserted in excised areas 120a and bent radially outwardly against frame 118. A frame 124, generally similar to frame 118, comprising vertical flange portions 124a, a circular aperture 126 (Fig. 3) formed therein, and a plurality of excised areas similar to those of frame 118 extending outwardly from said aperture is employed for mounting aspheric lens 102. Lens 102 is mounted within aperture 126, rimmed retaining ring 128, generally similar to ring 122, is placed against lens flange 102a and tabs 128a thereof are inserted in said excised areas and bent radially outwardly against frame 124. Aspheric lens 104 is mounted in frame 130 comprising vertical flange portions 130a, a circular aperture 132 formed therein, and a plurality of excised areas similar to those previously described extending outwardly from said aperture. Lens 104 is inserted in aperture 132, rimmed retaining ring 134 is placed against lens flange 104a, and the tabs 134a thereof are inserted in said excised areas and bent against frame 130.

A plurality of spring-like cross arms 136, 138, 140 and 142 (Figs. 3, 4, 8 and 9) are rigidly mounted upon upper and lower side portions of frame 118. Frame 124 is pivotally mounted between given extremities of the cross arms by a pair of pivotal bosses 144 and 146 (Figs. 3 and 8) formed in cross arms 138 and 142, and is held at operative position by a pair of detent bosses 148 and 150 (Figs. 3 and 8) formed in cross arms 136 and 140, said bosses being adapted to engage suitable concavities 151 (Fig. 9) formed in the side flanges 124a of frame 124. Frame 130 is similarly mounted between opposite extremities of said cross arms by a pair of bosses 152 and 154 and a second pair of bosses 156 and 158 which are adapted to engage concavities similar to concavity 151. A plurality of outwardly extending rigid ears or lugs 160, 162, 164 and 166 are preferably formed to extend from portions of the cross arms so as to be predeterminedly vertically positioned with respect to side portions of frame 118. Said lugs are adapted to be slidably mounted within vertically extending track means 110 and 112 for releasably mounting the entire lens carriage 108 in the projector. It will be noted in Fig. 10 that lug 166 is positioned vertically downward of lug 164. Track 112, comprising limit stop 112a (Figs. 1 and 4), extends downwardly to a greater depth than track 110, comprising limit stop 110a. Accordingly, lens carriage 108 can be fully mounted in the tracks only when lug 166 and lug 164 are inserted in track 112 and lugs 160 and 162 are inserted in track 110, thus insuring that the lens assembly is always correctly mounted, namely that the elements are relatively positioned in the projector as shown in Fig. 3. A handle 168 mounted on frame 118 is provided for readily mounting or removing lens carriage 108. When the lens carriage is removed from the projector, frames 124 and 130 may be pivoted to open position by springing the extremities 136a and 140a (Fig. 9) of the cross-arms apart, and the surfaces of lens elements 102, 104 and 106 may, for example, be examined and cleaned. Aspheric lenses 102 and 104 may if desired, be removed entirely from carriage 108 by then springing apart the extremities of cross-arms 138 and 142. Because of their shape and interlocking relation, element 102 and 106 of the condenser lens system could not be individually removed in a vertical direction. Pivotal mounting of the elements avoids such a necessity. It will be apparent that constructions of the invention which permit removal of the entire condenser lens assembly as a unit, also substantially eliminate the possibility of scratching the elements or of relatively mispositioning individual elements during replacement. Above-described means for mounting the condenser lens elements in carriage 108, and for mounting said carriage in track means 110 and 112 comprise a plurality of contacting surfaces so relatively positioned as to insure that the optical axis of the condenser lens system extends centrally, respectively, through aperture 58 of plate member 56, aperture 63 of housing 60, the aperture of adapter 85 and lens barrel 92 and through objective lens elements which, although not shown, are understood to be mounted in the latter.

Lamp socket 98, as shown in Fig. 3, is adjustably and releasably mounted upon flange portion 20b of supporting member 20 as, for example, in a clamp 170 carried by the flange portion 20b. The clamp 170 is secured to the portion 20b by a pair of wing members 172 which are rigidly attached to said clamp and extend laterally therefrom, each of said members 172 having a perforation 174 (Fig. 4) formed therein adjacent its extremity. Screw means 176 (Figs. 4 and 5) are inserted through perforations 174 and engaged in threaded perforations 178 (Fig. 4) formed in flange portion 20b, said screws being of appreciably smaller diameter than perforations 174. When screw means 176 are loosened, clamp 170 may be adjusted in a plurality of directions as permitted by the difference in diameters of the screws and perforations. A tensioning screw 180 (Fig. 3) engaging a nut (not shown) may be loosened to permit vertical or rotational adjustment of socket 98 in clamp 170, or to permit its removal therefrom.

A second clamp 182 is releasably attached to socket 98, being held in fixed engagement therewith by a tensioning screw 184 (Figs. 3 and 4) which is threaded in a nut 186. A lamp shield and heat baffle 188 is rigidly attached to clamp 182 by supporting studs 190, a rear wall portion of said lamp shield having a circular aperture 192 formed therein. Spherical concave reflector 94 is mounted adjacent aperture 192, the latter enabling portions of the reflector to extend therethrough in spaced relation to said rear wall portion of the lamp shield. Reflector 94 is rigidly mounted in a circularly apertured frame 194, the center of the reflector and the center of the circular aperture thereby coinciding, said reflector being retained in the frame by a plurality of clips 195 (Fig. 6). Frame 194 comprises three reinforced portions 194a, 194b and 194c which have threaded perforations 196, 198 and 200 formed therein. The centers of perforations 196 and 200 lie on a transverse line passing through the center of the frame aperture and, accordingly, are diametrically opposite one another, and the center of perforation 198 lies on a radial line extending from the center of the aperture at 90° to said line cutting perforations 196 and 200. Three tensioning screws 202, 204 and 206, are mounted for free rotation through suitably positioned perforations formed in the rear wall of lamp shield 188, and are somewhat loosely engaged in threaded perforations 196, 198 and 200 of the reflector frame. Coil springs 208, 210 and a spring (not shown), or other suitable resilient means, are respectively mounted upon tensioning screws 202, 204 and 206, on portions of the same which extend between the rear wall portion of the lamp shield and reflector mounting frame 194, said springs serving to bias reflector frame 194 in a direction away from lamp shield 188, said bias being opposed by the tensioning screws.

Figure 7:
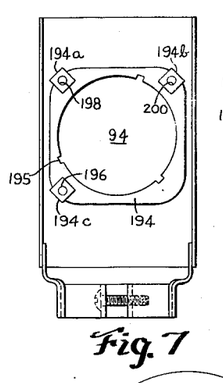
Fig. 7 is a front view of the subassembly shown in Fig. 6.

Referring to Figs. 3, 6, and 7 and considering the biasing effect of said springs and said loose engagement of the tensioning screws, it will be understood that adjustment of tensioning screw 206, associated with perforation 196, provides pivotal movement of reflector frame 194 around an axis passing through perforations 198 and 200. An adjustment of tensioning screw 204, associated with perforation 200, provides pivotal movement of said reflector frame around an axis passing through perforations 196 and 198. It follows, that an adjustment of tensioning screw 202, associated with perforation 198, provides pivotal movement of the reflector frame around an axis passing through perforations 196 and 200. Said operations enable angular adjustments of the reflector 94 in accordance with said pivotal movements of reflector frame 194. A similar adjustment of all of the tensioning screws provides forward or rearward adjustment of the reflector.

A complete positioning procedure for lamp 95 and reflector 94 utilizing the above-described construction follows, it being assumed for purposes of illustration that lamp 95 and reflector 94 are only approximately positioned in the projector. Assuming the condenser lens carriage to be mounted, as shown in Fig. 3, optical axis A—A represents the optical axis of the condenser lens system and A' indicates the position of the focal plane of the condenser lens system with respect to optical axis A—A. With housing 46 pivoted to open position, clamp tensioning screw 180 may be loosened, thereby releasing socket 98 from clamp 170, and socket 98, lamp 95, lamp shield 188 and reflector 94 may be removed from the projector as a unit. The reflector may then be adjusted, in the manner above-described, to bring a real image of lamp filament 96 to a correct position beside the actual filament. It will be understood that clamp 182 may be released by loosening tensioning screw 184, and socket 98 rotated to obtain any prepositioning of filament 97 which may be necessary. The unit may then be remounted in the projector by placing lamp socket 98 in clamp 170 and, after adjusting said socket vertically to position lamp filament 96 at the proper height with respect to optional axis A—A, tensioning screw 180 may be tightened. Screws 176, holding the wings of the lower clamp, may then be loosened and the entire unit may be adjusted in any lateral directions which may be necessary to establish filament 97 correctly within said focal plane A'.

Figure 11:
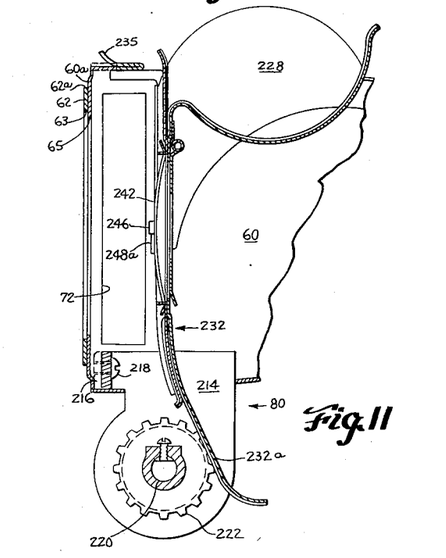
Fig. 11 is a side view of mechanism adapted to convert the projector into a slide film projector.

A preferred embodiment of the projector is adapted to use both slides and slide film interchangeably. Mechanism 80 for handling slide film is releasably mounted in housing 60 as shown in Figs. 1 and 2. In Fig. 3, the projector is shown with mechanism 80 removed, apertures 72 being adapted for introduction of a suitable slide carrier, it being understood that guide and framing means (not shown), for said slide carrier are mounted within housing 60 between said apertures 72. As shown in Fig. 11, individual mounting means 72 and 232 are provided for positioning a slide and slide-film, respectively, in separate planes for projection. Said mounting means are placed in spaced relation along the optical axis and permit alternate projection of a slide and slide film as well as continuous projection of one or the other form of transparency.

The slide film advancing mechanism (Figs. 1, 11, 12 and 13), comprises a supporting bracket 214 which is detachably mounted upon a supporting member 216, carried by housing 60, by screw means 218 (one screw and member not shown), said screw means being accessible through aperture 73 (Fig. 3). Bracket 214 serves to rotatably mount a shaft 220 which bears sprocket means 222 adapted to engage film such as 35 mm. slide film, and a pair of actuating knobs 223 positioned at each extremity of the shaft, for rotating said sprocket means. Suitable rotatable detent means 224 (Fig. 13), mounted upon shaft 220 and engaging fixed spring-like detent means 225 are provided for positioning frames of film at the projection aperture. Frictional framing means 226 for rotating said knobs, sprocket and detent means together, as a unit, to initially position the film are also provided, said framing means being actuated by lever 227.

Means associated with the film advancing mechanism for supplying the slide film comprise an open magazine 228 having a spring-actuated plunger 229 mounted upon a wall thereof. Said plunger may be drawn outwardly from magazine 228, against the bias of spring 230. A roll of slide film may then be placed in the magazine, and the plunger allowed to return to its normal position through the open center of the film roll, this releasably holding the film in the magazine.

Figures 12, 13, 14:
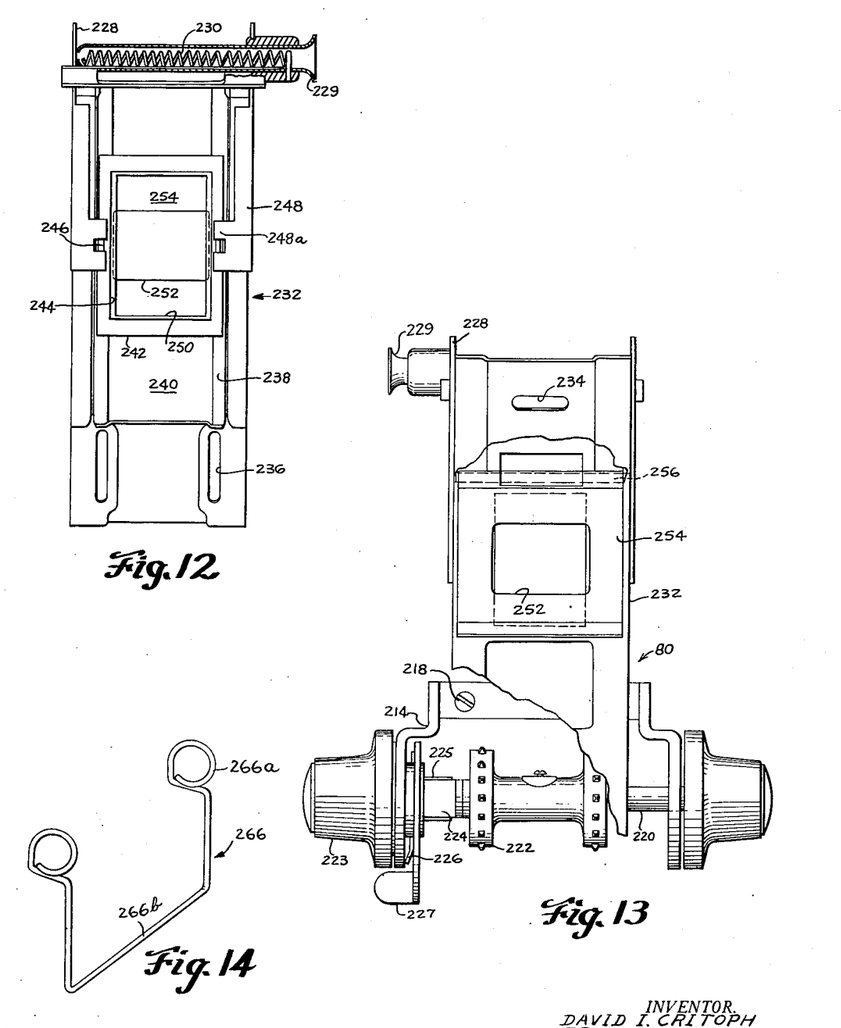
Fig. 12 is a rear view of elements shown in part in Fig. 11.
Fig. 13 is a front view of elements shown in Figs. 11 and 12.
Fig. 14 is a perspective view of strip film supporting means which may be employed in the projector shown in Fig. 1.

Magazine 228, as shown in Figs. 11, 12, and 13, is formed substantially unitary with composite plate means 232, the latter including or having associated therewith components for guiding the film to projection apertures, presently to be described, for framing the film with respect to said apertures, and for guiding the film to said sprocket means 222. When cover plate 81 (Fig. 3) has been removed, said unitary magazine and plate means may be inserted in housing 60, clip 83 then engaging a slot 234 formed adjacent an extremity of the magazine, an extending portion 235 of plate means 232 engaging portion 84 of the housing and an extremity 232a of the plate means bearing against peripheral portions of sprocket 222. A pair of slots 236 formed in the plate means permits unrestricted passage of the sprocket teeth therethrough.

As shown in Fig. 12, plate 232 comprises channeled or track means 238 for bearing marginal portions of the film, a recessed central area 240 for avoiding frictional contact with image areas of the film, a spring-like, pressure plate 242 having an aperture 244 formed therein and comprising bosses 246, and a pair of clip members 248 having bifurcated ends 248a engaging said bosses. Pressure plate 242 serves to bias the film in contact with guide plate means 232 adjacent a projection aperture 250 which is formed in plate 232. The focal plane of an objective lens is to be established at said aperture. Means forming a third aperture 252, presently to be described, is visible in Fig. 12, looking through aperture 250. Aperture 252 is dimensioned according to the dimensions of a single frame of film, while aperture 250 is of the size of double frames of film, said apertures being selectively adapted to accommodate either type of film. In Fig. 13, which illustrates both a surface of guide plate means 232 opposite to that shown in Fig. 12 and the film advancing means, a framing plate 254 having said projection aperture 252 formed therein, is shown as pivotally mounted upon guide plate means 232 by a hinge 256 comprising a frictional bearing which serves to hold plate 254 at any position to which it is pivoted. When plate 254 is positioned as shown, it serves to frame a single frame of film. When plate 254 is pivoted upwardly, out of the range of the projection beam, aperture 250, which, as above stated, is formed in guide plate means 232 serves to frame an area of the film equal to two single frames thereof. Either of said framing apertures may be employed at will according to the requirements of the film. Where the images are printed sideways of the film, housing 60 may be rotated, as previously described, to properly position the projected images on the screen.

The aforesaid constructions as shown and described permit a maximum of air circulation to all surfaces of the elements. A blower fan 258 (Fig. 3), driven by a motor 260 is mounted within the chamber of base 12, as shown in Fig. 3 and provides a forced flow of cool air to said surfaces. Air is drawn into said chamber through apertures 16 and is expelled upwardly through aperture 18 and through a plurality of apertures 262 (Figs. 3 and 4) formed in an upper frontal wall 12b of base 12. A plurality of apertures 263 are provided in the slide supporting frame for cooling a slide when mounted in apertures 72. The portion of cool air which is expelled through aperture 18 of base member 12 passes through supporting member 20 and is introduced to surfaces of an inner heat baffle 264 (Figs. 3 and 4) attached to housing 46, to lamp shield 188, reflector 94, lamp 95, condenser lenses 102 and 104 and heat shield 106. Heated air is expelled between light-shielded louvers 49 and through aperture 48 at the top of the projector. The tapered upper contour of housing 46 adjacent aperture 48 thereof, contributes to said expulsion of air in the form of a relatively narrow column which results in an upward flow of air adjacent outer wall surfaces of housing 46 and thus facilitates cooling of said surfaces. The portion of cool air which is expelled through apertures 262 of base member 12 flows upwardly, substantially in the form of a column, and enters aperture 78 of housing 60 wherein it is introduced to surfaces of either a slide or a slide film, according to which form of transparency may be mounted therein for projection. Air is released from housing 60 through light-shielded apertures 74 and 82 and between portions of slide aperture 72 and aperture 76, according to the type of transparency being projected. The above-described air-circulating system comprising said fan, plurality of heat baffles, mounting means for the various elements, and plurality of air intake and outlet apertures enables maintenance of enclosed elements of relatively low temperatures during operation of the projector and also prevents external housing surfaces from becoming noticeably heated.

Take-up means 266 is provided for receiving the slide film after its projection and for maintaining said film in a coiled condition ready for rewinding. Said take-up means may preferably be of a U shape and have a transverse portion 266b adapted to have the film coiled therearound and other portions adapted to be releasably attached to housing 60 such as a pair of clip-like members 266a. When a strip of slide film is advanced from sprocket 222 it has an inherent tendency to coil upon itself. Take-up portion 266b is positioned so that a coil of slide film will be formed thereabout after leaving sprockets 222. As the bulk and weight of the film increases it is supported by member 266b. When all of the film has passed to the take-up means, the trailing edge thereof may be drawn from the coil and the film may be rewound upon itself for placing the same in suitable condition for further projection.

It will be apparent that certain changes in the constructions set forth could be made without departing from the spirit of the invention and, therefore, it is intended that all matter contained in the above description or shown in the accompanying drawings shall be interpreted as illustrative and not in a limiting sense.

Attention is called to the fact that structure disclosed in this application is being claimed in copending divisional application No. 276,102 which was filed March 7, 1952.

What is claimed is:

1. In a projector, a releasable substantially rectangular supporting member for carrying both a plurality of optical elements and housing means therefor and for enabling both the tilting of said elements and housing means to elevate or lower a projection beam and provide access within enclosed portions of the projector, said supporting member comprising an apertured upper wall, and frontal, rear and side walls depending therefrom and terminating to form a lower aperture, the depending side walls having a pair of slots extending preferably rearwardly from their frontal edges for rendering a portion of said side walls compressible, complementary boss and recess means for pivotally and releasably connecting the supporting member with a projector base within which said member is adapted to be pivoted, one of said complementary means being carried by side wall portions of the supporting member and communicating with the frontal portions of each of said slots, and hinge means mounted upon a rear surface portion of the supporting member enabling pivotal attachment of a housing element thereto, said compressible side wall portions cooperating with said boss and recess means to permit removal of the supporting member and elements carried thereby from the base, and thereby providing access within the supporting member, housing and base.

2. In a projector, the combination of means for housing and adjustably mounting a lamp, an optical system and film accommodating means comprising a hollow base having an aperture in an upper wall thereof, an intermediate supporting member pivotally mounted upon said base, said member being substantially open at the top and bottom and having side walls depending partially within the aperture of said base, means carried by said base and intermediate supporting member for tilting the latter about a horizontal axis, housing means pivotally mounted upon said intermediate supporting member for enclosing and permitting access to said lamp and a condenser and reflector of said optical system, internal baffle means rigidly attached to said pivotal housing means, frontal plate means extending upwardly from and rigidly attached to said intermediate supporting member, said plate means abutting said pivotal housing means at closed position of the latter and having an aperture for permitting passage of light rays emanating from said lamp, a second internal baffle means extending inwardly from said frontal plate and abutting said first-named baffle means at closed position of said pivotal housing means, a third baffle means mounted upon said intermediate supporting member and positioned between said lamp and first-named baffle means, and frontal housing means connected to said frontal plate for mounting an objective and film accommodating means.

3. In a projector, the combination of means for housing and adjustably mounting a lamp, an optical system and film accommodating means comprising a hollow base having an aperture in an upper wall thereof, an intermediate supporting member having a releasable pivotal connection at frontal portions thereof with said base, said member having an inwardly extending flange for mounting a lamp socket at its upper extremities and being substantially open at the bottom and having resilient side walls depending partially within the aperture of said base which may be compressed for releasing said pivotal connection therewith, lever, pin and slot means carried by said base and intermediate supporting member for tilting the latter about a horizontal axis extending transversely of said projector, housing means having a pivotal connection at rear portions thereof with said intermediate supporting member for enclosing and permitting access to said lamp and a condenser and reflector of said optical system, internal baffle means rigidly attached to said pivotal housing means, frontal plate means extending upwardly from and rigidly attached to said intermediate supporting member, said plate means abutting said pivotal housing means at closed position of the latter and having an aperture for permitting passage of light rays emanating from said lamp, a second internal baffle means extending inwardly from said frontal plate and abutting said first-named baffle means at closed position of said pivotal housing means, a third baffle means mounted upon said intermediate supporting member and positioned between said lamp and first-named baffle means, and frontal housing means connected to said frontal plate for mounting an objective and film accommodating means.

4. In a projector, the combination of means for housing, adjustably mounting and efficiently cooling a lamp, an optical system and film accommodating means comprising a hollow base having a plurality of supporting feet, air inlet aperture means in a lower wall thereof, a relatively large access and air outlet aperture in central and rear portions of an upper wall thereof and a relatively smaller air outlet aperture in frontal portions of said upper wall, a motor driven blower fan mounted in said base beneath said air outlet apertures, an intermediate supporting member having a pivotal connection at frontal portions thereof with said base at a position directly above the blades of said fan, said member being substantially open at the top and bottom for transmittal of air therethrough and having side walls depending partially within the aperture of said base, means carried by said base and intermediate supporting member for tilting the latter about a horizontal axis, lamp socket means mounted upon a flange extending inwardly from upper extremities of the side walls of said intermediate supporting member, said flange terminating to permit passage of air therebetween and circulation thereof completely around said lamp, housing means having a pivotal connection at rear portions thereof with said intermediate supporting member for enclosing and permitting access to said lamp and a condenser and reflector of said optical system, said housing means being open at the bottom and abutting said intermediate supporting member at closed position and having an air outlet aperture in an upper wall thereof, internal heat baffle means rigidly attached to said pivotal housing means and extending around the sides and rear of said lamp, frontal plate means extending upwardly from and rigidly attached to said intermediate supporting member, said plate means abutting said pivotal housing means at closed position of the latter and having an aperture for permitting passage of light rays emanating from said lamp, a second internal heat baffle means extending inwardly from said frontal plate along the sides of said condenser and abutting said first-named heat baffle means at closed position of said pivotal housing means, a third heat baffle means mounted upon said lamp socket means and positioned around the sides and rear of said lamp between said lamp and first-named heat baffle means, and frontal housing means connected to said frontal plate for mounting an objective and film accommodating means, said frontal housing means having a plurality of air inlet and outlet apertures formed therein, an inlet aperture being positioned above said relatively smaller air outlet aperture of the base whereby air driven therethrough by said fan externally of the projector is caused to reenter the projector through said inlet aperture for cooling said film accommodating means.

5. In a projector, the combination of a hollow base having a relatively large aperture in an upper wall of said base, an intermediate supporting member, pivot means interconnecting said base and intermediate supporting member for adjustable tilting movement of the latter about a horizontally disposed axis, said intermediate supporting member being open at the top and bottom thereof and having substantially vertical walls depending partially within the aperture in said base, a housing enclosing the light source and condenser system of the projector, said housing comprising a front portion rigidly attached to and extending upwardly from said intermediate supporting member and a rear portion movably mounted relative thereto, rearwardly extending vertical flanges upon said front portion, an internal baffle vertically disposed within and carried by said rear portion in inwardly spaced relation thereto, said front portion including said flanges and said internal baffle together forming, when said rear portion is in closed position, an inner chamber for surrounding said light source and condenser, said rear portion together with said baffle and flanges forming a second chamber outwardly of the sides and rear of said first chamber, both of said chambers being partially open at the top and bottom ends thereof so as to allow the passage of air therethrough, a projection aperture in said front portion aligned with said condenser, a secondary housing carried by said front portion in alignment with said condenser and arranged to receive film supporting means, and to support an objective outwardly thereof, and an electric motor and fan in said base beneath said pivot means and positioned so as to direct air upwardly through said chambers for cooling purposes.

6. In a projector, the combination of a hollow base having a relatively large aperture in an upper wall of said base, relatively smaller aperture means in said upper wall forwardly of said large aperture, an intermediate supporting member, pivot means interconnecting said base and intermediate supporting member for adjustable tilting movement of the latter about a horizontally disposed axis, said intermediate supporting member being open at the top and bottom thereof and having substantially vertical walls depending partially within the aperture in said base, a housing enclosing the light source and condenser system of the projector, said housing comprising a front portion rigidly attached to and extending upwardly from said intermediate supporting member and a rear portion movably mounted relative thereto, rearwardly extending vertical flanges upon said front portion, an internal baffle vertically disposed within and carried by said rear portion in inwardly spaced relation thereto, said front portion including said flanges and said internal baffle together forming, when said rear portion is in closed position, an inner chamber for surrounding said light source and condenser, said rear portion together with said baffle and flanges forming a second chamber outwardly of the sides and rear of said first chamber, both of said chambers being partially open at the top and bottom ends thereof so as to allow the passage of air therethrough, a projection aperture in said front portion aligned with said condenser, a secondary housing carried by said front portion in alignment with said condenser and arranged to receive film supporting means, and to support an objective outwardly thereof, an opening in the lower wall of said secondary housing above the smaller aperture means in said base, and an electric motor and fan in said base beneath said pivot means and positioned so as to direct air upwardly through said chambers and secondary housing for cooling purposes.

7. In a projector, the combination of a hollow base having a relatively large aperture in an upper wall of said base, an intermediate supporting member, pivot means interconnecting said base and intermediate supporting member for adjustably tilting movement of the latter about a horizontally disposed axis, said intermediate supporting member being open at the top and bottom thereof and having substantially vertical walls depending partially within the aperture in said base, a housing enclosing the light source and condenser system of the projector, said housing comprising a front portion rigidly attached to and extending upwardly from said intermediate supporting member and a rear portion movably mounted relative thereto, rearwardly extending vertical flanges upon said front portion, an internal baffle vertically disposed within and carried by said rear portion in inwardly spaced relation thereto, said front portion including said flanges and said internal baffle together forming, when said rear portion is in closed position, an inner chamber for surrounding said light source and condenser, said rear portions together with said baffle and flanges forming a second chamber outwardly of the sides and rear of said first chamber, both of said chambers being partially open at the top and bottom ends for the passage of air therethrough, a second baffle carried by said intermediate supporting member and disposed between said first mentioned baffle and said light source at the sides and rear thereof, a projection aperture in said front portion aligned with said condenser, a secondary housing carried by said front portion in alignment with said condenser and arranged to receive film supporting means, and to support an objective outwardly thereof, and an electric motor and fan in said base beneath said pivot means and positioned so as to direct air upwardly through said chambers for cooling purposes.

8. In a projector having a light source, a condenser system, an objective and means for supporting film for projection purposes, the combination of a hollow base having an aperture in an upper wall thereof, an intermediate supporting member pivotally mounted upon said base, said member being substantially open at the top and bottom thereof and having side walls depending partially within the aperture of said base, means carried by said base and said intermediate supporting member for tilting the latter about a horizontal axis, housing means supported by said intermediate supporting member and normally enclosing said light source and condenser, internal baffle means attached to said housing means, frontal plate means extending upwardly from and rigidly attached to said intermediate supporting member for movement therewith about said horizontal axis, said frontal plate means substantially abutting forward portions of said housing means and having an aperture therein for permitting passage of light rays emanating from said light source, second internal baffle means carried in fixed relation to and extending longitudinally from said frontal plate means at opposite sides thereof and substantially abutting said first-named internal baffle means at locations spaced inwardly of said housing means, said housing means carrying said first-named internal baffle means being movable out of its normal position so as to provide access to said light source and condenser system, and supplemental housing means connected to said frontal front plate means in vertically spaced relation to said base and supporting said objective and said film supporting means for movement with said frontal plate means about said horizontal axis.

9. In a projector having a light source, a condenser system, an objective and means for supporting film for projection purposes, the combination of a hollow base having an aperture in an upper wall thereof, an intermediate supporting member pivotally mounted upon said base, said member being substantially open at the top and bottom thereof and having side walls depending partially within the aperture of said base, means carried by said base and said intermediate supporting member for tilting the latter about a horizontal axis, said tilting means comprising a manually operable lever pivotally carried by said base adjacent one of said depending side walls and at a position spaced longitudinally relative to the pivotal connection between said intermediate supporting member and said base, said lever having an actuating portion extending from said base through a recess formed therein and a projection carried by an arm of said lever within said base, the pivotal axis of said lever being positioned adjacent said recess, a cam surface formed on a part carried by the adjacent depending side wall of said intermediate supporting member and having slidable engagement with said projection, housing means supported by said intermediate supporting member and normally enclosing said light source and condenser, internal baffle means attached to said housing means, frontal plate means extending upwardly from and rigidly attached to said intermediate supporting member for movement therewith about said horizontal axis, said frontal plate means substantially abutting forward portions of said housing means and having an aperture therein for permitting passage of light rays emanating from said light source, second internal baffle means carried in fixed relation to and extending longitudinally from said frontal plate means at opposite sides thereof and substantially abutting said first-named internal baffle means at locations spaced inwardly of said housing means, said housing means carrying said first-named internal baffle means being movable out of its normal posiiton so as to provide access to said light source and condenser system, and supplemental housing means connected to said frontal plate means in vertically spaced relation to said base and supporting said objective and said film supporting means for movement with said frontal plate means about said horizontal axis.

10. In a projector having a light source, a condenser system, an objective and means for supporting film for projection purposes, the combination of a hollow base having an aperture in an upper wall thereof, an intermediate supporting member pivotally mounted upon said base, said member being substantially open at the top and bottom thereof and having vertical side walls depending partially within the aperture of said base, means carried by said base and said intermediate supporting member for tilting the latter about a horizontal axis, said tilting means comprising a manually operable lever pivotally carried by said base at a position spaced longitudinally relative to the pivotal connection between said intermediate supporting member and said base, a projection carried by a portion of said lever located within said base and adjacent one of said depending vertical side walls of said intermediate supporting member, a cam surface formed on a part carried by the adjacent vertical side wall of said intermediate supporting member and having slidable engagement with said projection so as to be elevated or lowered thereby when said projection is swung in a vertical arc by movement of said lever, housing means supported by said intermediate supporting member and normally enclosing said light source and condenser, internal baffle means attached to said housing means, frontal plate means extending upwardly from and rigidly attached to said intermediate supporting member for movement therewith about said horizontal axis, said frontal plate means substantially abutting forward portions of said housing means and having an aperture therein for permitting passage of light rays emanating from said light source, second internal baffle means carried in fixed relation to and extending longitudinally from said frontal plate means at opposite sides thereof and substantially abutting said first-named internal baffle means at locations spaced inwardly of said housing means, said housing means carrying said first-named internal baffle means being movable out of its normal position so as to provide access to said light source and condenser system, and supplemental housing means connected to said frontal plate means in vertically spaced relation to said base and supporting said objective and said film supporting means for movement with said frontal plate means about said horizontal axis.

11. In a projector having a light source, a condenser system, an objective and means for supporting film for projection purposes, the combination of a hollow base having an aperture in an upper wall thereof, an intermediate supporting member pivotally mounted upon said base, said member being substantially open at the top and bottom thereof and having side walls depending partially within the aperture of said base, means carried by said base and said intermediate supporting member for tilting the latter about a horizontal axis, housing means supported by said intermediate supporting member and normally enclosing said light source and condenser, internal baffle means attached to said housing means, frontal plate means extending upwardly from and rigidly attached to said intermediate supporting member for movement therewith about said horizontal axis, said tilting means comprising a manually operable lever pivotally carried by said base at a position spaced longitudinally relative to the pivotal connection between said intermediate supporting member and said base, a projection carried by said lever, a cam surface formed on a part carried by one of said depending side walls of said intermediate supporting member and having slidable engagement with said projection, said lever and cam surface being so arranged that the rate of pivotal movement of said lever materially exceeds the rate of pivotal movement of said intermediate supporting member, said frontal plate means substantially abutting forward portions of said housing means and having an aperture therein for permitting passage of light rays emanating from said light source, second internal baffle means carried in fixed relation to and extending longitudinally from said frontal plate means at opposite sides thereof and substantially abutting said first-named internal baffle means at locations spaced inwardly of said housing means, said housing means carrying said first-named internal baffle means being movable out of its normal position so as to provide access to said light source and condenser system, and supplemental housing means connected to said frontal plate means in vertically spaced relation to said base and supporting said objective and said film supporting means for movement with said frontal plate means about said horizontal axis.

12. In a projector having a light source, a condenser system, an objective and means for supporting film for projection purposes, the combination of a hollow base having an aperture in an upper wall thereof, an intermediate supporting member pivotally mounted upon said base, said member being substantially open at the top and bottom thereof and having side walls depending partially within the aperture of said base, means carried by said base and said intermediate supporting member for tilting the latter about a horizontal axis, housing means supported by said intermediate supporting member and normally enclosing said light source and condenser, internal baffle means attached to said housing means, frontal plate means extending upwardly from and rigidly attached to said intermediate supporting member for movement therewith about said horizontal axis, said tilting means comprising a manually operable lever pivotally carried by said base at a position spaced longitudinally relative to the pivotal connection between said intermediate supporting member and said base, a projection carried by said lever, a cam surface formed on a part carried by one of said depending side walls of said intermediate supporting member and having slidable engagement with said projection, said lever and cam surface being so arranged that the rate of pivotal movement of said lever materially exceeds the rate of pivotal movement of said intermediate supporting member, and frictional means intermediate said base and said intermediate supporting members preventing undesired movement of the latter relative to the former but allowing easy manual actuation of said lever for tilting said intermediate supporting member, said frontal plate means substantially abutting forward portions of said housing means and having an aperture therein for permitting passage of light rays emanating from said light source, second internal baffle means carried in fixed relation to and extending longitudinally from said frontal plate means at opposite sides thereof and substantially abutting said first-named internal baffle means at locations spaced inwardly of said housing means, said housing means carrying said first-named internal baffle means being movable out of its normal position so as to provide access to said light source and condenser system, and supplemental housing means connected to said frontal plate means in vertically spaced relation to said base and supporting said objective and said film supporting means for movement with said frontal plate means about said horizontal axis.

13. In a projector having a light source, a condenser system, an objective and means for supporting film for projection purposes, the combination of a hollow base having a relatively large aperture in an upper wall thereof and smaller aperture means in said upper wall forwardly thereof, an intermediate supporting member pivotally mounted upon said base, said member being substantially open at the top and bottom thereof and having side walls depending partially within the aperture of said base, means carried by said base and said intermediate supporting member for tilting the latter about a horizontal axis disposed adjacent a forward portion of said supporting member, housing means supported by said intermediate supporting member and normally enclosing said light source and condenser, internal baffle means attached to said housing means, frontal plate means extending upwardly from and rigidly attached to said intermediate supporting member for movement therewith about said horizontal axis, said frontal plate means substantially abutting forward portions of said housing means and having an aperture therein for permitting passage of light rays emanating from said light source, second internal baffle means carried in fixed relation to and extending longitudinally from said frontal plate means at opposite sides thereof and substantially abutting said first-named internal baffle means at locations spaced inwardly of said housing means, said housing means carrying said first-named internal baffle means being movable out of its normal position so as to provide access to said light source and condenser system, and supplemental housing means connected to said frontal plate means in vertically spaced relation to said base and supporting said objective and said film supporting means for movement with said frontal plate means about said horizontal axis, aperture means in said supplemental housing means disposed substantially vertically above said smaller aperture means in said base, and air circulating means within said base and beneath said large and smaller aperture means and arranged to direct air upwardly therethrough for cooling the spaces within said housing and said baffle means and surrounding said light source and condenser system and the space within said supplemental housing means and adjacent said film supporting means.

14. In a projector having a lamp, a condenser, an objective and film positioning means, the combination of a hollow base having an aperture in an upper wall thereof, an intermediate supporting member having releasable pivotal connections adjacent frontal portions thereof with said base, said intermediate supporting member having an inwardly extending flange for mounting a lamp socket adjacent its upper extremities, said member also being substantially open at the top and bottom thereof and having resilient side wall portions depending partially within said aperture and which may be compressed for releasing said pivotal connection with said base, lever means carried by said base and intermediate supporting member for tilting the latter about a horizontal axis extending transversely of said projector and through said releasable pivot connections, housing means carried by said intermediate supporting member for enclosing said lamp and said condenser, internal baffle means rigidly attached to said housing means, frontal plate means extending upwardly from and rigidly attached to said intermediate supporting member, said frontal plate means substantially abutting said housing means when in operative position, said housing means being movable away from said front plate means to provide access to the interior of said housing, said frontal plate means having an aperture for the passage of light rays emanating from said lamp, a second internal baffle means extending rearwardly from said frontal plate means and substantially abutting said first-named baffle means in spaced relation to said housing means, and supplemental housing means carried by said frontal plate for supporting an objective and said film positioning means.

DAVID I. CRITOPH.
JOHN F. HERRMANN.
FRED H. WOLFORD.

REFERENCES CITED

The following references are of record in the file of this patent:

UNITED STATES PATENTS

| Number | Name | Date |
|---|---|---|
| 1,032,065 | Kamm | June 9, 1912 |
| 1,227,507 | Victor | May 22, 1917 |
| 1,282,293 | Roebuck | Oct. 22, 1918 |
| 1,399,111 | Granz | Dec. 6, 1921 |
| 1,434,455 | Simon | Nov. 7, 1922 |
| 1,704,814 | Wellman | Mar. 12, 1929 |
| 1,716,322 | Proctor | June 4, 1929 |
| 1,731,104 | Mayer | Oct. 8, 1929 |
| 1,849,151 | Ott | Mar. 15, 1932 |
| 1,921,214 | Carpenter | Aug. 8, 1933 |
| 1,962,356 | Mihalyi | June 12, 1934 |
| 1,966,531 | Tint | July 17, 1934 |
| 2,037,454 | Boecking | Apr. 14, 1936 |
| 2,126,474 | Kleerup | Aug. 9, 1938 |
| 2,169,010 | Teague et al. | Aug. 8, 1939 |
| 2,172,256 | Nagel | Sept. 5, 1939 |
| 2,194,366 | Ott | Mar. 19, 1940 |
| 2,214,050 | Fowler | Sept. 10, 1940 |
| 2,243,160 | Koehl | May 27, 1941 |
| 2,251,077 | Stanton | July 29, 1941 |
| 2,374,038 | Ress | Apr. 17, 1945 |
| 2,379,690 | Cunningham | July 3, 1945 |
| 2,380,613 | Ress | July 31, 1945 |

FOREIGN PATENTS

| Number | Country | Date |
|---|---|---|
| 883,522 | France | Mar. 29, 1943 |
| 563,669 | Great Britain | Aug. 24, 1944 |